No. 608,911. Patented Aug. 9, 1898.
H. A. REED.
ELECTRIC CABLE.
(Application filed Oct. 24, 1896.)

(No Model.)

WITNESSES,
W. H. Humphrey.
J. Green

INVENTOR,
Henry A. Reed
per Knight Bros
ATTORNEYS.

UNITED STATES PATENT OFFICE.

HENRY A. REED, OF NEWARK, NEW JERSEY.

ELECTRIC CABLE.

SPECIFICATION forming part of Letters Patent No. 608,911, dated August 9, 1898.

Application filed October 24, 1896. Serial No. 609,904. (No model.)

*To all whom it may concern:*

Be it known that I, HENRY A. REED, a citizen of the United States, residing at Newark, in the county of Essex and State of New Jersey, have invented certain new and useful Improvements in Electric Cables, of which the following is a specification.

This invention relates to improvements in electric cables; and its object is to provide a cable especially adapted for use with alternating currents.

In submarine cables it has been the usual practice to surround the central conductor with an insulating layer and outside of this with a protective sheath or armor, the latter being generally of iron wire wound around the cable in a spiral direction. In using such a cable for transmitting alternating currents it has been found that the self-induction of the conductor surrounded in this manner by magnetic material is so great as to impede or choke the current very seriously. In case of currents of high frequency, such as generally employed in electric lighting by alternating current, this choking effect is so great as to practically stop the flow of current. To avoid this difficulty, I make the sheath or armor of a non-magnetic metal, such as copper or bronze, the same having sufficient abrasion-resisting qualities and strength without the objectionable inductive quality of iron or steel.

Figure 1:
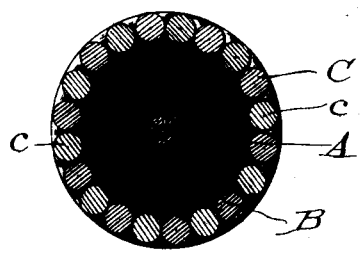
Figure 2:
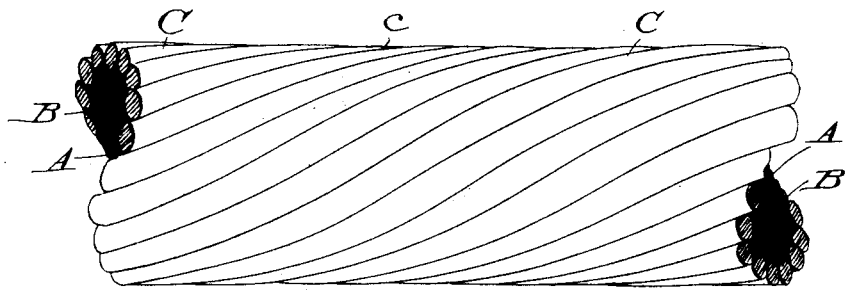

In the accompanying drawings, which form a part of this specification, Figure 1 is a cross-section of an electric cable embodying my invention. Fig. 2 is a side view of a portion of the same.

In constructing a cable according to my invention the conductor A is first covered or inclosed in an insulating coat or layer B. An armor or sheathing C, of copper or other non-magnetic metal, is then placed around and over the insulation, the same being preferably in the form of spirally-laid wires c, wound tightly over the cable and completely covering same. The insulating coat or layer B may be formed of any of the usual materials applied in the manner usual in forming submarine cables.

Having thus described my invention, what I claim, and desire to secure by Letters Patent, is—

1. In an electric cable, the combination with the conductor and the insulating covering therefor, of a sheathing or armor for said cable consisting of spirally-laid wires of non-magnetic metal.

2. A sheathing or armor for electric cables consisting of spirally-laid wires of copper or other non-magnetic metal.

3. In an electric cable, the combination with a conductor and the insulating covering therefor, of a sheathing or armor for said cable consisting of non-magnetic metal wires laid spirally around said cable and completely covering same.

HENRY A. REED.

Witnesses:
M. V. BIDGOOD,
J. GREEN.